US008456694B2

(12) United States Patent  (10) Patent No.: US 8,456,694 B2
Beretta                    (45) Date of Patent:     Jun. 4, 2013

(54) SYSTEM AND METHOD FOR PROOFING A PAGE FOR COLOR DISCRIMINABILITY PROBLEMS BASED ON COLOR NAMES

(75) Inventor: Giordano Bruno Beretta, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2492 days.

(21) Appl. No.: 11/123,560

(22) Filed: May 6, 2005

(65) Prior Publication Data

US 2006/0250669 A1  Nov. 9, 2006

(51) Int. Cl.
  G06F 15/00 (2006.01)
  G03F 1/46 (2006.01)

(52) U.S. Cl.
  USPC ............ 358/1.9; 358/518; 382/173; 382/162; 345/593

(58) Field of Classification Search
  USPC ................................... 358/1.9, 518
  See application file for complete search history.

(56) References Cited

U.S. PATENT DOCUMENTS

| | | |
|---|---|---|
| 5,254,978 A | 10/1993 | Beretta |
| 5,311,212 A | 5/1994 | Beretta |
| 5,416,890 A | 5/1995 | Beretta |
| H1506 H | 12/1995 | Beretta |
| 5,615,320 A | 3/1997 | Lavendel |
| 5,870,771 A | 2/1999 | Oberg |
| 6,081,253 A | 6/2000 | Luke et al. |
| 2004/0080670 A1 | 4/2004 | Cheatle |
| 2004/0122806 A1 | 6/2004 | Sang, Jr. et al. |
| 2005/0084152 A1* | 4/2005 | McPeake et al. ............. 382/173 |
| 2005/0157926 A1* | 7/2005 | Moravec et al. ............. 382/173 |
| 2006/0087517 A1* | 4/2006 | Mojsilovic ................... 345/593 |

OTHER PUBLICATIONS

B. Lampson et al., "Personal Distributed Computing: The Alto and Ethernet Software"; 38 pgs; Jan. 1986.
G. Beretta, "A New Approach to Imaging IC Layout and Schematics"; 44 pgs; Apr. 1988.
G. Beretta, "Selecting Colors for Representing VLSI Layout"; 15 pgs; Dec. 1988.
G. Beretta, "Color Palette Selection Tools"; pp. 94-96; May 1990.
Rogowitz et al., "Which Trajectories Through Which Perceptually Uniform Color Spaces Produce Appropriate Color Scales for Interval Data"; pp. 321-326; 1999.
A. Kalvin et al., "Building Perceptual Color Maps for Visualizing Interval Data"; pp. 323-335; May 2000.

(Continued)

Primary Examiner — Marivelisse Santiago Cordero
Assistant Examiner — Huo Long Chen (57) ABSTRACT

An automated method for proofing a page for color discriminability problems includes converting a first color of a first object appearing on the page and a second color of a second object appearing on the page to coordinates of a color naming system. The method includes identifying a first color name of the first color and a second color name of the second color based on the coordinates. The method includes identifying whether the first color and the second color are discriminable based on the first color name and the second color name.

41 Claims, 6 Drawing Sheets

OTHER PUBLICATIONS

A. Kalvin et al., "A Fast Perceptual Method for Evaluating Color Scales for Internet Visualization"; pp. 463-469; Jun. 2001.

F. Nack et al., "Colour Picking—The Pecking Order of Form and Function"; pp. 279-282; Nov. 2003.

P. Robertson, "Perceptual Color Spaces—Visualizing Color Gamuts: A User Interface for the Effective Use of Perceptual Color Spaces in Data Displays"; pp. 50-64; 1988.

Prof. A. Nemcsics, "Coloroid Colour System" manuscript; 14 pgs.

K. Kelly et al., "The ISCC-NBS Method of Designating Colors and a Dictionary of Color Names"; Nat'l Bureau of Standards Circular 553, 18 pgs; Nov. 1955.

Prof. A. Nemcsics, "Colour Dynamics—Environmental Colour Design"; 31 pgs; 1993.

* cited by examiner

SYSTEM AND METHOD FOR PROOFING A PAGE FOR COLOR DISCRIMINABILITY PROBLEMS BASED ON COLOR NAMES

CROSS-REFERENCE TO RELATED APPLICATION

This application is related to U.S. patent application Ser. No. 11/017,012, filed on Dec. 20, 2004, and entitled "System and Method for Determining an Image Frame Color for an Image Frame"; and U.S. patent application Ser. No. 11/017,405, filed Dec. 20, 2004 and entitled "System and Method for Proofing a Page For Color Discriminability Problems", which are both hereby incorporated by reference herein.

BACKGROUND

The Internet has enabled new digital printing workflows that are distributed, media-less, and share knowledge resources. One new application in the commercial printing field is referred to as "variable data printing" (VDP), where a rich template is populated with different data for each copy, typically merged from a database or determined algorithmically. In variable data printing, pages may be created with an automated page layout system, which places objects within a page and automatically generates a page layout that is pleasing to a user.

Variable data printing examples include permission-based marketing, where each copy is personalized with a recipient name, and the contents are chosen based on parameters like sex, age, income, or ZIP code; do-it-yourself catalogs, where customers describe to an e-commerce vendor their purchase desires, and vendors create customer catalogs with their offerings for that desire; customized offers in response to a tender for bids, with specification sheets, white papers, and prices customized for the specific bid; insurance and benefit plans, where customers or employees receive a contract with their specific information instead of a set of tables from which they can compute their benefits; executive briefing materials; and comic magazines, where the characters can be adapted to various cultural or religious sensitivities, and the text in the bubbles can be printed in the language of the recipient.

In traditional printing, the final proof is inspected visually by the customer and approved. In variable data printing, each printed copy is different, and it is not practical to proof each copy. When there are small problems, like a little underflow or overflow, the elements or objects on a page can be slightly nudged, scaled, or cropped (in the case of images). When the overflow is larger, the failure can be fatal, because objects will overlap and may no longer be readable or discriminable because the contrast is too low. When pages are generated automatically and not proofed, gross visual discriminability errors can occur.

Similarly, when background and foreground colors are automatically selected from limited color palettes, color combinations can be generated which, due to insufficient contrast, make text unreadable for readers with color vision deficiencies, or even for those with normal color vision. In the case of images, they can sink into a background or become too inconspicuous. This problem can happen in marketing materials when objects receive indiscriminable color combinations. This problem can be very subtle. For example, corporations may change their color palettes. Marketing materials that have been generated at an earlier point in time may no longer comply with the current palette and create confusion in the customer. In a variable data printing job, older material that was generated based on an older version of a color palette, may be printed with substitute colors from an updated color palette, and two previously very different colors could be mapped into close colors, causing discriminability issues.

Previously, the discriminability of objects in a print was verified visually on a proof print. In the case of variable data printing, this task is too onerous to be practical, because each printed piece is different. An automated solution to this problem is desirable. There are tools to automatically build pleasing color palettes for electronic documents, but these tools apply to the authoring phase, not to the production phase. In particular, these tools do not check the discriminability of objects.

SUMMARY

One form of the present invention provides an automated method for proofing a page for color discriminability problems. The method includes converting a first color of a first object appearing on the page and a second color of a second object appearing on the page to coordinates of a color naming system. The method includes identifying a first color name of the first color and a second color name of the second color based on the coordinates. The method includes identifying whether the first color and the second color are discriminable based on the first color name and the second color name.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
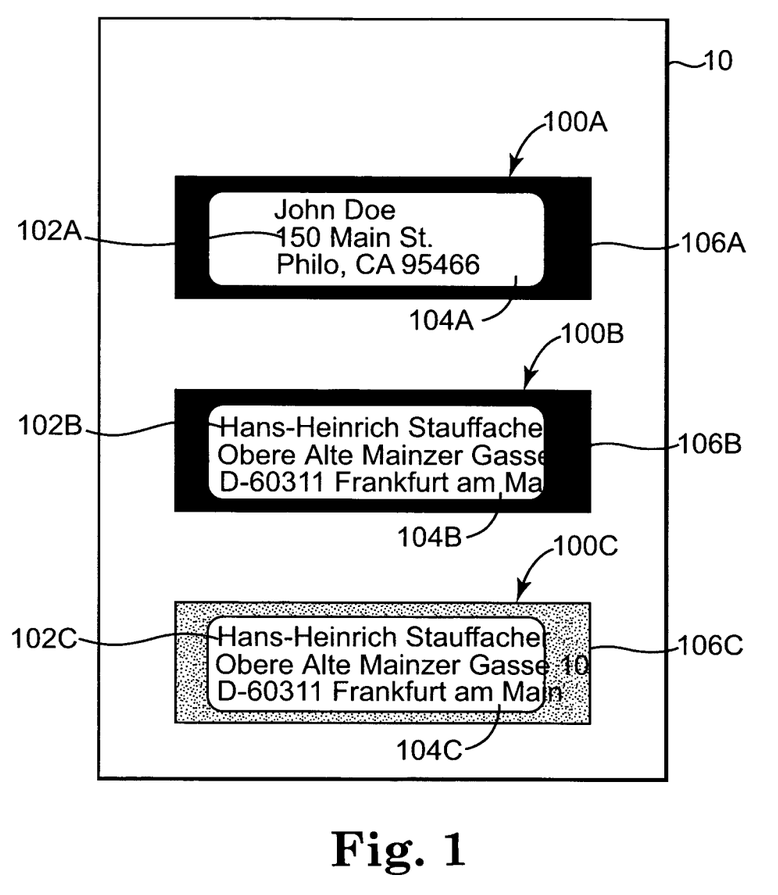
FIG. 1 is a diagram illustrating an example page that could be created with an automated page layout system in a variable data printing process, and color problems that can occur in such a process.

FIG. 1 is a diagram illustrating an example page 10 that could be created with an automated page layout system in a variable data printing process, and color problems that can occur in such a process. It will be understood by persons of ordinary skill in the art that, although objects may be shown in black and white or grayscale in the Figures, embodiments of the present invention are applicable to objects of any color. A concept that is used in one embodiment of the present invention is the concept of "color discriminability." Color discriminability, according to one form of the invention, refers to the ability of an ordinary observer to quickly recognize a colored object or element on top of another colored object or element. Color discriminability is different than color difference, which is based solely on thresholds, and is different than distinct color, which refers to media robustness. The colors of two overlapping objects or elements are discriminable when the colors can quickly or instantly be told apart by an ordinary observer.

As shown in FIG. 1, page 10 includes three shipping labels 100A-100C (collectively referred to as shipping labels 100). Shipping label 100A includes foreground text object 102A, a first colored background object 104A, and a second colored background object 106A. First background object 104A is substantially rectangular in shape, and has a very light color (e.g., white). Second background object 106A surrounds first background object 104A, and is darker in color than first background object 104A. For shipping label 100A, the text in text object 102A fits entirely within the background object 104A. There is good contrast between the text object 102A and the background object 104A, and there are no color discriminability issues that need to be addressed for this particular shipping label 100A. However, in a variable data printing application, the text for the shipping labels 100 will vary, which can cause a problem like that shown in shipping label 100B.

Shipping label 100B includes foreground text object 102B, a first colored background object 104B, and a second colored background object 106B. First background object 104B is substantially rectangular in shape, and has a very light color (e.g., white). Second background object 106B surrounds first background object 104B, and is darker in color than first background object 104B. For shipping label 100B, the text in text object 102B does not fit entirely within the background object 104B, but rather a portion of the text overlaps the background object 106B. The text object 102B is the same or very similar in color to the background object 106B, and the portion of the text that overlaps the background object 106B is not visible. The foreground and the background colors are not discrirninable for shipping label 100B.

Shipping label 100C includes foreground text object 102C, a first background object 104C, and a second colored background object 106C. For shipping label 100C, the text in text object 102C does not fit entirely within the background object 104C, but rather a portion of the text overlaps the background object 106C. The text object 102C is darker in color than the background object 106C, and the portion of the text that overlaps the background object 106C is visible. The foreground and the background colors are discriminable for shipping label 100C.

In a variable data printing job, it is not typically practical to proof every generated page. Automatic layout re-dimensioning works for some situations, but re-dimensioning algorithms, such as an algorithm based on the longest address for a mailing label, are driven by a few unusual cases, rather than the most likely data. For the mailing label example illustrated in FIG. 1, the problem can be solved by using a different font, such as a condensed or smaller font, making the label area larger, or splitting the address on multiple lines. However, in many situations, automatically selecting compatible colors for a page is a more convenient solution, and provides more visually pleasing results. Further, when the variable content is an image, for example, changing the background color may be the only solution. For an image over a colored background, if the image is close in color to the background, the image may blend into the background, causing the depicted object to essentially disappear.

In the examples illustrated in FIG. 1, the foreground objects are text objects. It other embodiments, the foreground objects are image objects, or other types of objects. An object, according to one form of the invention, refers to any item that can be individually selected and manipulated, such as text, shapes, and images or pictures that appear on a display screen. Examples of objects include text, images, tables, columns of information, boxes of data, graphs of data, audio snippets, active pages, animations, or the like. The images may be drawings or photographs, in color or black and white.

Figure 2:
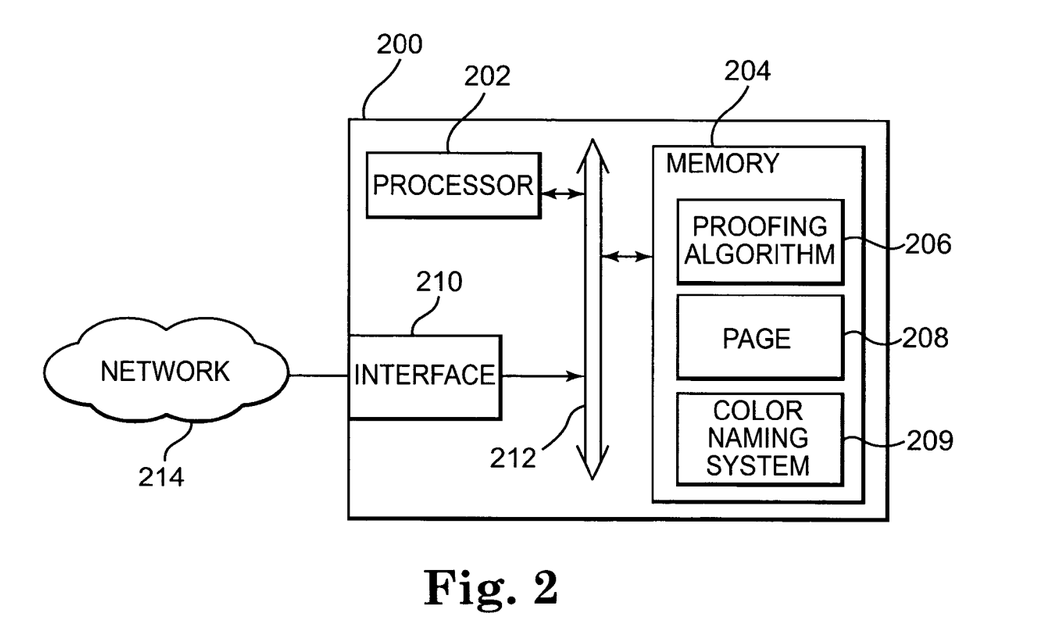
FIG. 2 is block diagram illustrating a computer system suitable for implementing one embodiment of the present invention.

FIG. 2 is block diagram illustrating a computer system 200 suitable for implementing one embodiment of the present invention. As shown in FIG. 2, computer system 200 includes processor 202, memory 204, and network interface 210, which are communicatively coupled together via communication link 212. Computer system 200 is coupled to network 214 via network interface 210. Network 214 represents the Internet or other type of computer or telephone network. It will be understood by persons of ordinary skill in the art that computer system 200 may include additional or different components or devices, such as an input device, a display device, an output device, as well as other types of devices.

In one embodiment, memory 204 includes random access memory (RAM) and read-only memory (ROM), or similar types of memory. In one form of the invention, memory 204 includes a hard disk drive, floppy disk drive, CD-ROM drive, or other type of non-volatile data storage. In one embodiment, processor 202 executes information stored in the memory 204, or received from the network 214.

As shown in FIG. 2, proofing algorithm 206, page 208, and color naming system 209, are stored in memory 204. In one embodiment, processor 202 executes proofing algorithm 206, which causes computer system 200 to perform various proofing functions, including proofing functions to identify color discriminability issues for page 208. In one embodiment, computer system 200 is configured to execute algorithm 206 to automatically proof objects on pages, such as page 208, for visual discriminability problems or errors, and compute suggestions to solve the errors, or automatically correct the errors. In one form of the invention, computer system 200 verifies a layout to be printed in a variable data print job for discriminability of all objects placed in the layout. In one embodiment, computer system 200 compares the color of two objects to assess their discriminability to an observer, such as the discriminability of text or images placed over a colored background. In one embodiment, computer system 200 generates an error log identifying discriminability issues for subsequent manual correction, and suggests discriminable color combinations that could be used to correct the discriminability problems. In another embodiment, computer system 200 corrects color discriminability problems "on-the-fly."

In one form of the invention, the pages to be proofed by computer system 200, such as page 208, are automatically generated pages that are generated as part of a variable data printing process, and that are received by computer system 200 from network 214, or from some other source. Techniques for automatically generating pages of information are known to those of ordinary skill in the art, such as those disclosed in commonly assigned U.S. Patent Application Publication No. 2004/0122806 A1, filed Dec. 23, 2002, published Jun. 24, 2004, and entitled "Apparatus and Method for Market-Based Document Layout Selection", which is hereby incorporated by reference herein.

It will be understood by a person of ordinary skill in the art that functions performed by computer system 200 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory. It is intended that embodiments of the present invention may be implemented in a variety of hardware and software environments.

In one embodiment, color naming system 209 is based on the Coloroid Color System, which is registered as Hungarian Standard MSZ 7300. The Coloroid system is scaled for esthetical uniformity at large color differences. In other embodiments, color naming system 209 is based on a color naming system other than the Coloroid system, such as the Inter-Society Color Council and National Bureau of Standards (ISCC-NBS) system.

The Coloroid color space is a three dimensional space in which colors are specified by three Coloroid coordinates: (1) hue (denoted by "A"); (2) saturation (denoted by "T"); and (3) luminosity or lightness (denoted by "V"). The Coloroid system includes 48 different basic colors, each with a different basic hue (A). The basic hue values (A) for the 48 basic colors are integer values that range from 10 to 76.

Figure 3A:
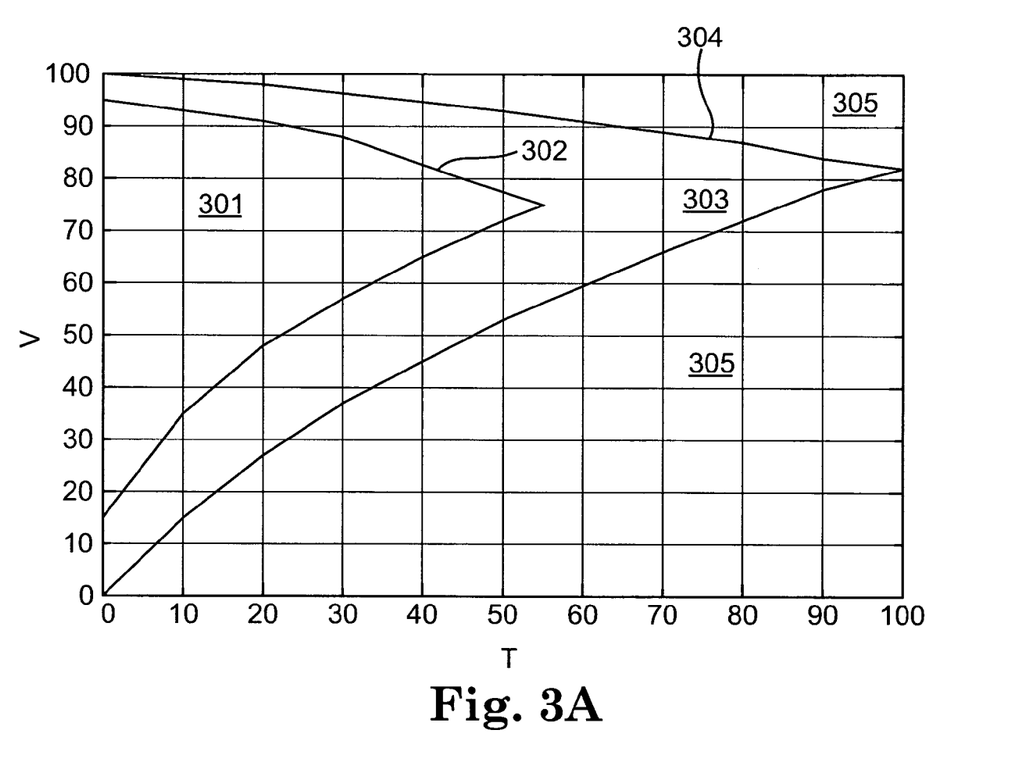
FIG. 3A is a diagram illustrating color gamuts for basic hue twenty (A=20) in the Coloroid system.

FIG. 3A is a diagram illustrating color gamuts for basic hue twenty (A=20) in the Coloroid system, which is yellowish orange one. The horizontal axis in FIG. 3A represents saturation (T), and the vertical axis represents luminosity (V). Curve 302 defines gamut 301. Gamut 301 is a gamut of "solid colors", which are colors the physical objects in the world (e.g., paints) can have. The color names in the Coloroid system are defined in gamut 301. Curve 304 defines gamut 303 (which includes gamut 301). Gamut 303 is a gamut of physically possible colors. Such colors exist, for example, in a rainbow, or can be produced with laser lights, but are generally a superset of natural object colors. Computer displays can also produce colors inside gamut 303 between curves 302 and 304. Saturation and luminosity (T, V) values outside of gamut 303, which are represented by region 305, are not physically possible, but can occur in practice due to rounding errors in the various computations to transform from one color space to another.

Figure 3B:
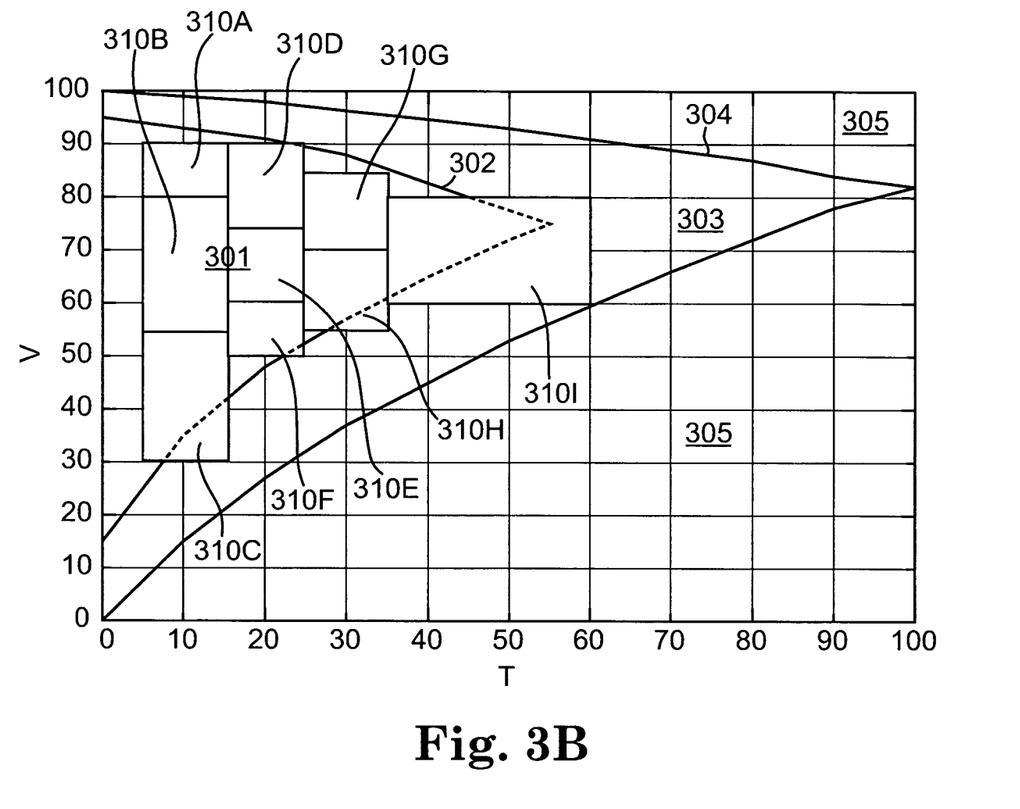
FIG. 3B is a diagram illustrating Coloroid color name regions for basic hue twenty (A=20) in the Coloroid system.

FIG. 3B is a diagram illustrating Coloroid color name regions 310A-310I for basic hue twenty (A=20) in the Coloroid system. Each of the color name regions 310A-310I has a rectangular shape, and is positioned at least partially within gamut 301. Each of the color name regions 310A-310I has an associated color name. The color names associated with regions 310A-310I are broken warm white, cement grey, Anatolian brown, Roman ochre, Arsigont, brown beige, Pompeian yellow, orange ochre, and Indian orange, respectively. Any color with a hue value of twenty (A=20) and saturation and luminosity (T, V) values that fall within a particular one of the regions 310A-310I is assigned the name associated with that particular region. Since the color regions 310A-310I are each two-dimensional regions that cover a range of saturation and luminosity (T, V) values, multiple colors having a hue value of twenty (A=20), but having different saturation and luminosity (T, V) values, can be assigned the same color name if the saturation and luminosity (T, V) values all fall within the same color name region. Note that the gamut 301 is only partially covered by the color name regions 310A-310I, and only a small portion of the gamut 303 between curves 302 and 304 is covered by the color name regions 310A-310I.

Figure 3C:
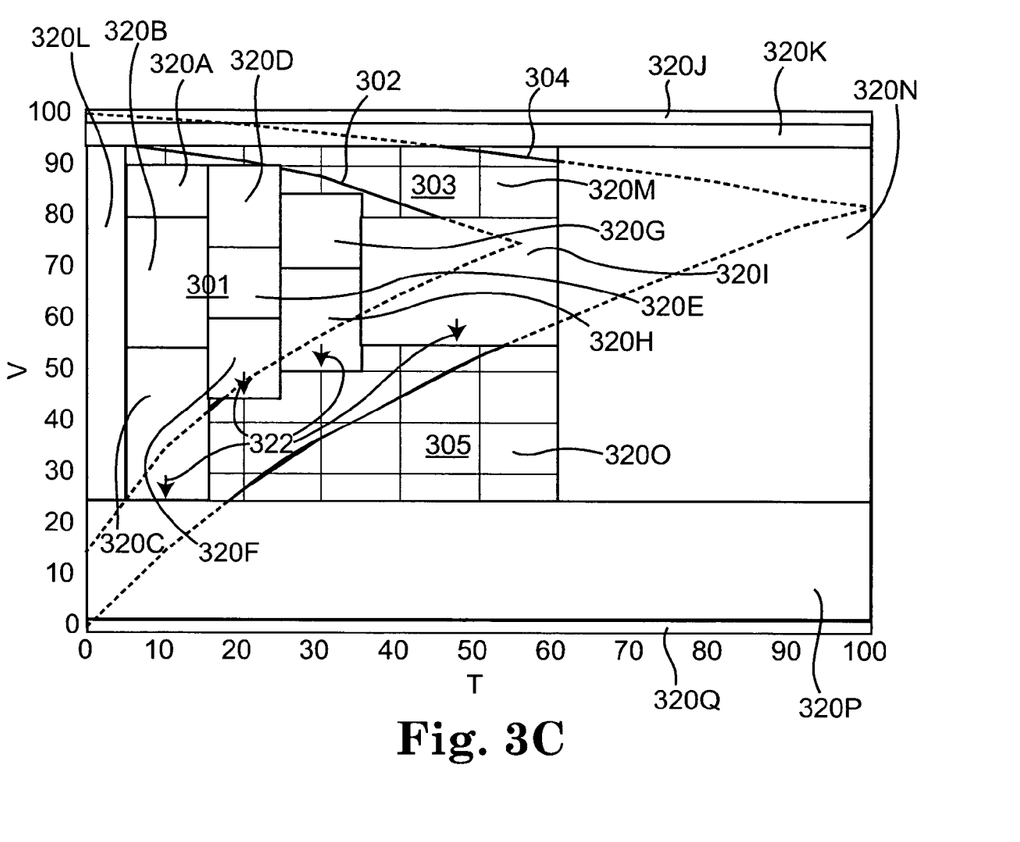
FIG. 3C is a diagram illustrating color name regions for basic hue twenty (A=20) in the color naming system according to one embodiment of the present invention.

FIG. 3C is a diagram illustrating color name regions 320A-320Q (collectively referred to as color name regions 320) for basic hue twenty (A=20) in the color naming system 209 according to one embodiment of the present invention. In one embodiment, color naming system 209 is based on the Coloroid system, but provides extended coverage of the gamuts shown in FIG. 3A, and provides additional color name regions and color names. Each of the color name regions 320A-320Q has an associated color name. The color names associated with regions 320A-320I are the same as the names associated with regions 310A-310I shown in FIG. 3B (i.e., broken warm white, cement grey, Anatolian brown, Roman ochre, Arsigont, brown beige, Pompeian yellow, orange ochre, and Indian orange, respectively). The regions 320A-320I are similar in shape and size to regions 310A-310I, but have been extended towards black (i.e., towards V=0) as indicated by arrows 322, to provide better coverage of the colors within gamut 301.

The color names associated with regions 320J-320Q are absolute white, white, grey, bright yellowish orange, vivid yellowish orange, deep yellowish orange, black, and absolute black, respectively. In one embodiment, region 320J (absolute white) covers a luminosity value of 100 (V=100) across the entire range of saturation (T) values; region 320K (white) covers luminosity values that are greater than 95 and less than 100 (95<V<100) across the entire range of saturation (T) values; region 320P (black) covers luminosity values that are greater than 0 and less than 25 (0<V<25) across the entire range of saturation (T) values; and region 320Q (absolute black) covers a luminosity value of 0 (V=0) across the entire range of saturation (T) values. Region 320L (grey) covers muted colors (i.e., low T values), and region 320N covers colors that are more vivid (i.e., high T values) than the most vivid color in the Coloroid system. The color name regions also include two non-rectangular regions, region 320M (bright yellowish orange) and region 320O (deep yellowish orange), to complete the coverage of the entire range of saturation and luminosity (T, V) values for basic hue twenty (A=20).

Any color with a hue value of twenty (A=20) and saturation and luminosity (T, V) values that fall within a particular one of the regions 320A-310Q is assigned the name associated with that particular region. Since the color regions 320A-320Q are two-dimensional regions that cover a range of saturation and luminosity (T, V) values, multiple colors having a hue value of twenty (A=20), but having different saturation and luminosity (T, V) values, can be assigned the same color name if the saturation and luminosity (T, V) values all fall within the same color name region. Note that the gamuts 301 and 303, and the region 305 are completely covered by the color name regions 320A-320Q.

In one form of the invention, the extension of color name regions in the Coloroid system, and the addition of new color name regions, as illustrated in FIG. 3C and described above, is repeated for each of the 48 basic hues (A) in the Coloroid system, to complete the three-dimensional color naming system 209. In other embodiments, different color names and different boundaries for the color name regions may be used. In the complete three-dimensional color naming system 209, each of the color name regions 320 is a three-dimensional region.

Modern digital presses have a large gamut compared to the Coloroid surface colors. Art designed on computer displays tends to use much more vivid and bright colors as is the case, for example, in the architectural and urban applications considered by the creator of the Coloroid system. Good results have been achieved in embodiments of the present invention by extending the color names in each of the forty-eight basic hues (A) in the Coloroid system by using the primary color name prefixed by "bright" for high lightness values, "deep" for low lightness values, and "vivid" for high saturation values.

In one form of the invention, the color names in color naming system 209 are implemented in a data structure where the color names are sorted by basic hue values (A). For each of the basic hue values (A), the color names are sorted by saturation value (T). For each of the saturation values (T), the color names are sorted by luminosity value (V). In one embodiment, the color naming system 209 data structure is implemented with a three-dimensional array, referred to as a "greedy algorithm". In another embodiment, the color naming system 209 data structure is implemented using a grid file system. In another embodiment, the color naming system 209 data structure is implemented using a corner stitching algorithm. In yet another embodiment, the color naming system 209 is implemented with a binning data structure augmented with neighbor links.

Figure 4:
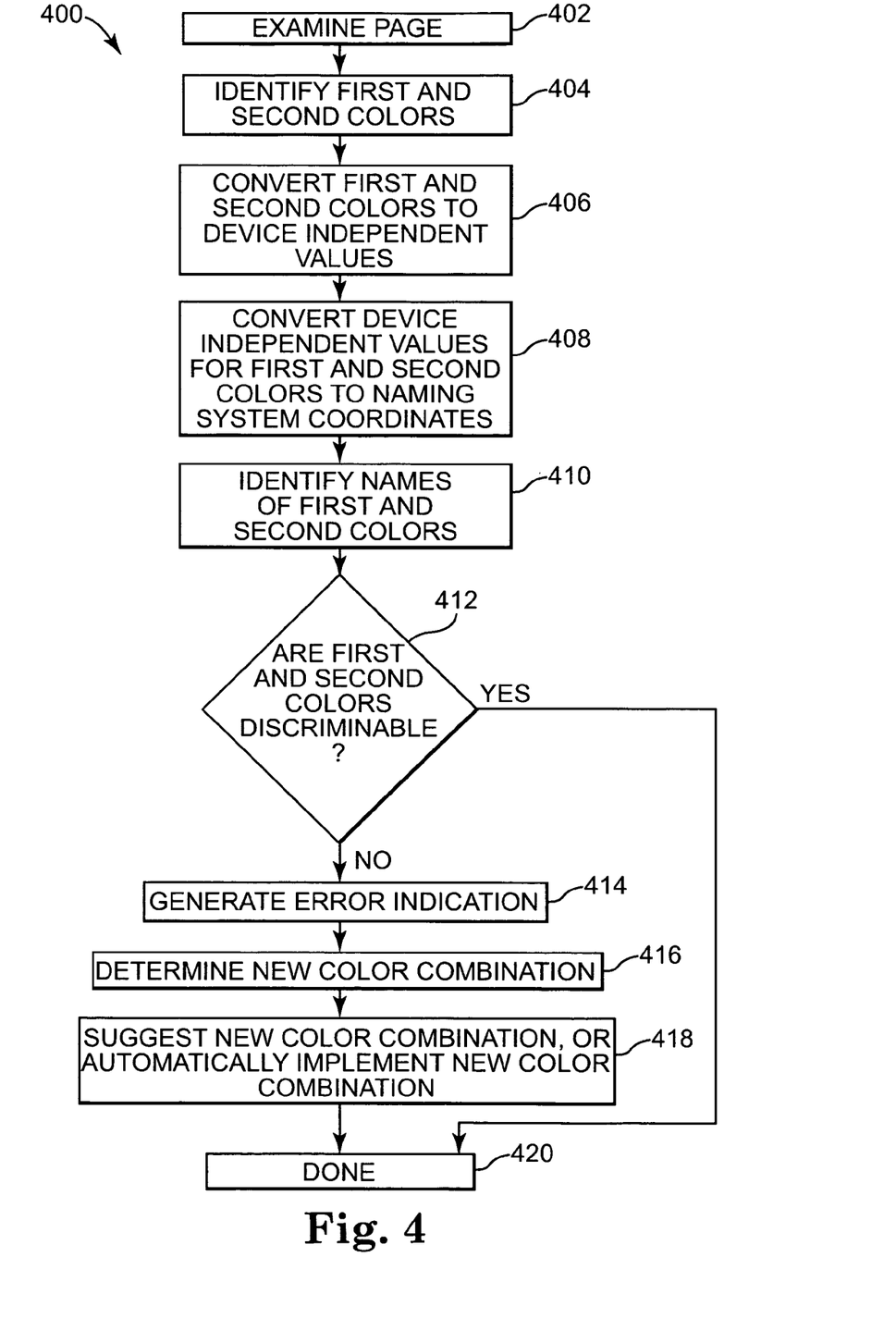
FIG. 4 is a flow diagram illustrating a method for automatically identifying color problems in a variable data printing process according to one embodiment of the present invention.

FIG. 4 is a flow diagram illustrating a method 400 for automatically identifying color problems in a variable data printing process according to one embodiment of the present invention. In one embodiment, computer system 200 (FIG. 2) is configured to perform method 400 by executing proofing algorithm 206. In one form of the invention, method 400 determines discriminable color combinations for background and foreground objects appearing on a page, so that text remains visible and images do not vanish into the background in variable data printing applications.

At 402, computer system 200 examines a page 208, and identifies overlapping objects on the page 208. In one embodiment, computer system 200 identifies at least one foreground object on the page 208 and at least one background object on the page 208, wherein the foreground and background objects at least partially overlap. In one embodiment, the foreground object is text or an image. At 404, computer system 200 identifies a first color and a second color appearing on the page 208. In one embodiment, the first color is a color of a foreground object identified at 402, and the second color is a color of a background object identified at 402.

In one embodiment, the colors identified at 404 are device dependent colors. A device dependent color classification model provides color descriptor classifications or dimensions, that are derived from, and which control, associated physical devices. Such device dependent color classification models include the additive red, green, and blue (RGB) phosphor color model used to physically generate colors on a color monitor, and the subtractive cyan, yellow, magenta, and black (CYMK) color model used to put colored inks or toners on paper.

Referring again to FIG. 4, after identifying the device dependent first and second colors at 404, at 406 in method 400, computer system 200 converts the device dependent first and second colors to device independent values. One such device independent color specification system has been developed by the international color standards group, the Commission Internationale de l'Eclairage ("CIE"). The CIE color specification employs device independent "tristimulus values" to specify colors and to establish device independent color models by assigning to each color a set of three numeric XYZ tristimulus values according to its color appearance under a standard source illumination as viewed by a standard observer. In one embodiment, at 406 in method 400, computer system 200 converts the device dependent first and second colors to device independent CIE XYZ tristimulus values.

At 408 in method 400, computer system 200 converts the device independent tristimulus values for the first and second colors to corresponding coordinates in the color naming system 209 (FIG. 2). In one form of the invention, the color naming system 209 is based on the Coloroid naming system, and the tristimulus values for the first and second colors are converted at 408 into Coloroid hue, saturation, and luminosity (A, T, V) coordinates.

At 410 in method 400, computer system 200 identifies a color name for the first color (first color name) and a color name for the second color (second color name) from the color naming system 209 based on the coordinates obtained at 408. In one embodiment, at 410 in method 400, computer system 200 converts the Coloroid coordinates obtained at 408 to corresponding color names using nested case statements on hue (A), saturation (T), and lightness (V).

At 412 in method 400, computer system 200 determines whether the first and second colors are discriminable. In one embodiment, computer system 200 makes the determination at 412 based on the first color name and the second color name identified at 410, and whether the identified names are different. In one form of this embodiment, if it is determined at 412 that the names identified at 410 are different, the first and the second colors are deemed to be discriminable, and the method 400 jumps to 420, which indicates that the method 400 is done. If it is determined at 412 that the names identified at 410 are the same, the first and the second colors are deemed to not be discriminable, and the method 400 moves to 414.

In another embodiment, at 412 in method 400, computer system 200 determines whether the first and second colors are discriminable based on the lexical distance between the first color name and the second color name. The lexical distance according to one embodiment is the number of color names between the first color name and the second color name in color naming system 209. In one form of the invention, computer system 200 makes the determination at 412 based on the first color name and the second color name identified at 410, and whether the lexical distance between the identified names is greater than a threshold value. In one form of this embodiment, if it is determined at 412 that the lexical distance is greater than the threshold value, the first and the second colors are deemed to be discriminable, and the method 400 jumps to 420, which indicates that the method 400 is done. If it is determined at 412 that the lexical distance is not greater than the threshold value, the first and the second colors are deemed to not be discriminable, and the method 400 moves to 414.

In yet another embodiment, at 412 in method 400, computer system 200 determines whether the first and second colors are discriminable based on the lightness difference between the first color and the second color. In one form of this embodiment, computer system 200 converts the device dependent first and second colors to a perceptually uniform color space (described in further detail below), computes a difference value that represents the difference between the lightness value for the first color and the lightness value for the second color in the perceptually uniform color space, and compares the difference value to a threshold value. If it is determined at 412 that the difference value is greater than the threshold, the first and the second colors are deemed to be discriminable, and the method 400 jumps to 420, which indicates that the method 400 is done. If it is determined at 412 that the difference value is not greater than the threshold, the first and the second colors are deemed to not be discriminable, and the method 400 moves to 414. In one form of the invention, the lightness difference between two colors is used to determine the discriminability of colored text on a colored background.

The CIE has recommended the use of two perceptually uniform color spaces: the CIE 1976 (L*u*v*) or the CIELUV color space, and the CIE 1976 (L*a*b*) color space (hereinafter referred to as "CIELAB space"). In one embodiment, at 412 in method 400, computer system 200 converts the device dependent first and second colors to the CIELAB space. However, it is intended that embodiments of the present invention may use any of the currently defined perceptually uniform color spaces, such as the CIELUV space, the Munsell color space, and the OSA Uniform Color Scales, or a future, newly defined perceptually uniform color space.

Colors specified in CIELAB space with their L*, a*, and b* coordinates are difficult to visualize and reference as colors that are familiar to users. In this disclosure, for purposes of referring to colors by known names and according to human perceptual correlates, colors specified in CIELAB space are also referenced by the human perceptual correlates of lightness (L), chroma (C), and hue (H). A color is then designated in the CIELAB space with a coordinate triplet (L, C, H), representing the lightness, chroma, and hue, respectively, of the color. The CIELAB correlates for lightness, chroma, and hue are obtained by converting the coordinates from Cartesian coordinates to cylindrical coordinates.

At 414 in method 400, computer system 200 generates an error indication, which indicates that the first and the second colors are not discriminable. In one embodiment, computer system 200 maintains an error log that identifies all color discriminability issues for a given variable data printing job.

At 416 in method 400, computer system 200 determines a new, discriminable color combination for the first and the second colors. In one embodiment, at 416, computer system 200 identifies a new color name for the first color, wherein the new first color name and the second color name are different. In another embodiment, computer system 200 identifies a new color name for the second color, wherein the new second color name and the first color name are different. In yet another embodiment, computer system 200 identifies a new color name for the first color and a new color name for the second color, wherein the two new color names are different.

In one embodiment, at 416 in method 400, a new color name for the first color, or the second color, or both the first color and the second color are determined by selecting the next darker color name or the next lighter color name from the color naming system 209, such that the lightness contrast for the new color combination is greater than the lightness contrast for the original color combination. For example, referring to FIG. 3C, if the color name to be changed is cement gray, corresponding to color name region 320B, the next darker color name is Anatolian brown, corresponding to color name region 320C. The next darker color name is determined by moving downward (i.e., lower V values) from the color name to be changed. The next lighter color name in this example is broken warm white, corresponding to color name region 320A. The next lighter color name is determined by moving upward (i.e., higher V values) from the color name to be changed.

After determining a new color combination at 416, method 400 moves to 418. In one embodiment, at 418, computer system 200 provides a suggestion to the user to use the new color combination identified at 416. In this embodiment, the user may choose to use the new color combination, or keep the original colors. In another embodiment, at 418, computer system 200 converts the color names identified at 416 to corresponding coordinates in the color naming system 209, converts the color naming system coordinates to corresponding CIE XYZ tristimulus values, converts the CIE XYZ tristimulus values to corresponding device dependent values, and automatically replaces the device dependent values for the original color combination with the device dependent values for the new color combination. Method 400 then moves to 420, which indicates that the method 400 is done.

In one embodiment, when a foreground object being analyzed by computer system 200 is an image that is placed over a colored background object, computer system 200 is configured to use method 400 to adjust the color of the background object, if necessary, to correct any discriminability problems. In this situation, according to one embodiment, computer system 200 computes a representative color for the image by averaging all, or a portion, of the colors of the image. Computer system 200 then uses the computed representative color and the background color as the first and second colors in method 400, and changes the background color, if appropriate, in the same manner as described above with respect to FIG. 4. In one form of the invention, computer system 200 computes a periphery color for the image by averaging the colors at a periphery portion of the image. Computer system 200 then uses the computed periphery color and the background color as the first and second colors in method 400, and changes the background color, if appropriate, in the same manner as described above with respect to FIG. 4.

In one embodiment, method 400 provides robust color selections, such that objects are discriminable to people with color vision deficiencies, as well as those people that have normal color vision. In one embodiment, method 400 relies on lightness contrast between two colors, which helps to make the method 400 robust for those with color vision deficiencies.

Method 400 at 408 involves a mapping between CIE XYZ tristimulus values and Coloroid coordinates. The relation between CIE XYZ tristimulus values and Coloroid coordinates will now be described in further detail. The Coloroid hue (A) is a function of the tangent (tg) of the angle, $\phi$, between the horizontal and the radius from the illuminant's chromaticity point $(x_0, y_0)$ to that of the color under consideration $(x, y)$, in the CIE 1931 diagram, as shown by the following Equation I:

$$tg\varphi = \frac{y - y_0}{x - x_0} \qquad \text{Equation I}$$

In one embodiment, the value obtained from Equation I is used to locate the nearest Coloroid basic hue (A) using a binary search in a table relating A to $\phi$ followed by interpolation. The Coloroid saturation (T) is obtained using either the following Equation II or Equation III:

$$T_1 = 100 \frac{Y \cdot \varepsilon_w (x_0 - x)}{100 \cdot \varepsilon_\lambda (x - x_\lambda) + Y_\lambda \cdot \varepsilon_w (x_0 - x)} \qquad \text{Equation II}$$

$$T_2 = 100 \frac{Y(1 - y \cdot \varepsilon_w)}{100 \cdot \varepsilon_\lambda (y - y_\lambda) + Y_\lambda (1 - y \cdot \varepsilon_\lambda)} \qquad \text{Equation III}$$

In Equations II and III above, x and y are the chromaticity coordinates, Y is the luminance, $\epsilon$ is one hundredth of the sum of the tristimulus values, w is the white point, and λ is the boundary color. The values for the boundary colors are stored in lookup tables.

The Coloroid lightness (V) is ten times the square root of the luminance, Y, as shown in the following Equation IV:

$$V = 10 \cdot \sqrt{Y}$$ Equation IV

The most delicate calculation to implement is that of the saturation (T), given above in Equations II and III. Although the literature indicates that either formula (Equation II or Equation III) can be used, the two Equations yield very different values. It has been determined that Equation II provides the correct saturation prediction when the condition in the following Equation V is satisfied:

$$|(x_0-x)/(y_0-y)| \geq |(y_0-y)/(x_0-x)|$$ Equation V

If the condition defined in Equation V is not satisfied, then Equation III is used to determine the saturation (T) in one form of the invention.

The luminance (Y) of the boundary colors is a critical quantity that should be determined with sufficient precision. A small error in the hue (A) determination will entail a large error in the boundary luminance determination and by consequence a large error in the saturation (T) calculation. In making discriminability determinations based on color names, integer calculations are sufficient, because the error is small in comparison to the area of the color name regions corresponding to color names. However, in one form of the invention, computer system 200 is also configured to suggest aesthetically pleasing color palettes, and in this embodiment, the table interpolation in the hue calculation should be performed with sufficient accuracy.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An automated computer-implemented method for proofing a page for color discriminability problems, the method comprising:
converting with a computer a first color of a first object appearing on the page and a second color of a second object appearing on the page to coordinates of a color naming system;
identifying with the computer a first color name of the first color and a second color name of the second color based on the coordinates; and
identifying with the computer whether the first color and the second color are discriminable based on the first color name and the second color name.

2. The automated method of claim 1, wherein the first color and the second color are converted from device dependent values to device independent values, and then converted from the device independent values to the coordinates of the color naming system.

3. The automated method of claim 2, wherein the device independent values are CIE tristimulus values.

4. The automated method of claim 1, wherein the first object is text and the second object is a colored background object.

5. The automated method of claim 1, wherein the first object is an image and the second object is a colored background object.

6. The automated method of claim 1, wherein the first and the second objects at least partially overlap on the page.

7. The automated method of claim 1, wherein the first color and the second color are deemed to be discriminable if the first color name and the second color name are different.

8. The automated method of claim 1, wherein the first color and the second color are deemed to be discriminable if the first color name and the second color name are separated in the color naming system by a threshold number of color names.

9. The automated method of claim 1, wherein the first color and the second color are deemed to be discriminable if a difference between a lightness value associated with the first color name and a lightness value associated with the second color name is greater than a threshold value.

10. The automated method of claim 1, wherein the first object is an image, and wherein the step of converting a first color of a first object comprises averaging colors of the image to obtain a representative color for the image.

11. The automated method of claim 1, wherein the first object is an image, and wherein the step of converting a first color of a first object comprises averaging colors of a periphery portion of the image to obtain a representative color for the image.

12. The automated method of claim 1, and further comprising:
generating with the computer an error indication if it is determined that the first color and the second color are not discriminable.

13. The automated method of claim 1, and further comprising:
determining with the computer a new discriminable color combination for the first and the second colors if it is determined that the first color and the second color are not discriminable.

14. The automated method of claim 13, wherein the step of determining a new discriminable color combination comprises:
selecting with the computer a new color name from the color naming system for at least one of the first color and the second color.

15. The automated method of claim 13, and further comprising:
displaying a suggestion to a user to use the new color combination for the first and the second objects.

16. The automated method of claim 13, and further comprising:
automatically changing with the computer the first and the second colors to the new color combination.

17. The automated method of claim 1, wherein the page is generated by an automated page layout system.

18. The automated method of claim 1, wherein the page is generated in a variable data printing process.

19. The automated method of claim 1, wherein the color naming system is based on the Coloroid color system.

20. A system for automatically identifying color discriminability problems of objects appearing on a page, the system comprising:
a memory for storing the page; and
a processor coupled to the memory for converting a first color associated with a first object on the page and a second color associated with a second object on the page to coordinates of a color naming system, and identifying whether the first color and the second color are discriminable based on identified names for the first and second colors in the color naming system.

21. The system of claim 20, wherein the first color and the second color are converted by the processor from device dependent values to device independent values, and then converted from the device independent values to the coordinates of the color naming system.

22. The system of claim 21, wherein the device independent values are CIE tristimulus values.

23. The system of claim 20, wherein the first color and the second color are deemed to be discriminable if the identified names for the first and second colors are different.

24. The system of claim 20, wherein the first color and the second color are deemed to be discriminable if the identified names for the first and second colors are separated in the color naming system by a threshold number of color names.

25. The system of claim 20, wherein the first color and the second color are deemed to be discriminable if a difference between lightness values associated with the identified names is greater than a threshold value.

26. The system of claim 20, wherein the first object is an image, and wherein converting a first color associated with a first object on the page comprises averaging colors of the image to obtain a representative color for the image.

27. The system of claim 20, wherein the processor is configured to determine a new discriminable color combination for the first and the second colors if it is determined that the first color and the second color are not discriminable.

28. The system of claim 27, wherein the new discriminable color combination is determined by selecting a new color name from the color naming system for at least one of the first color and the second color.

29. The system of claim 20, wherein the color naming system is based on the Coloroid color system.

30. A system for proofing a page for color discriminability problems, the page including a first object and a second object, the system comprising:
means for identifying a first color name of a first color associated with the first object and a second color name of a second color associated with the second object; and
means for determining whether the first color and the second color are discriminable based on the identified first color name and the second color name.

31. The system of claim 30, and further comprising:
means for converting the first color and the second color to coordinates of a color naming system; and
wherein the means for identifying is configured to identify the first color name and the second color name based on the coordinates in the color naming system of the first color and the second color.

32. The system of claim 31, and further comprising:
means for converting the first color and the second color from device dependent values to device independent values; and
wherein the means for converting the first color and the second color to coordinates of a color naming system is configured to convert the device independent values for the first color and the second color to the coordinates of the color naming system.

33. The system of claim 30, wherein the first color and the second color are deemed to be discriminable if the identified names for the first and second colors are different.

34. The system of claim 30, wherein the first color and the second color are deemed to be discriminable if the identified names for the first and second colors are separated in a color naming system by a threshold number of color names.

35. The system of claim 30, wherein the first color and the second color are deemed to be discriminable if a difference between lightness values associated with the identified names is greater than a threshold value.

36. A non-transitory computer-readable medium having computer-executable instructions for performing a method of identifying color discriminability problems of objects appearing on a page to be printed, comprising:
identifying a first color name of a first color associated with a first object appearing on the page;
identifying a second color name of a second color associated with a second object appearing on the page; and
determining whether the first color and the second color are discriminable based on the first color name and the second color name.

37. The non-transitory computer-readable medium of claim 36, wherein the method further comprises:
converting the first color and the second color to coordinates of a color naming system; and
wherein the first color name and the second color name are identified based on the coordinates of the color naming system.

38. The non-transitory computer-readable medium of claim 37, wherein the method further comprises:
converting the first color and the second color from device dependent values to device independent values; and
converting the device independent values for the first color and the second color to the coordinates of the color naming system.

39. The non-transitory computer-readable medium of claim 36, wherein the first color and the second color are deemed to be discriminable if the identified names for the first and second colors are different.

40. The non-transitory computer-readable medium of claim 36, wherein the first color and the second color are deemed to be discriminable if the identified names for the first and second colors are separated in a color naming system by a threshold number of color names.

41. The non-transitory computer-readable medium of claim 36, wherein the first color and the second color are deemed to be discriminable if a difference between lightness values associated with the identified names is greater than a threshold value.

* * * * *